United States Patent
Mitsui et al.

(10) Patent No.: US 6,802,074 B1
(45) Date of Patent: Oct. 5, 2004

(54) RECORDING APPARATUS, TRANSMITTING APPARATUS, AND COMPUTER-READABLE RECORDING MEDIUM

(75) Inventors: Yoshitaka Mitsui, Ibaraki (JP); Hideshi Ishihara, Katano (JP); Takahiro Nagai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 915 days.

(21) Appl. No.: 09/584,145

(22) Filed: May 31, 2000

(30) Foreign Application Priority Data

May 31, 1999 (JP) .......................................... 11-151658

(51) Int. Cl.[7] .............................................. H04N 7/16
(52) U.S. Cl. ............................ 725/25; 725/27; 725/31; 386/46; 386/94; 386/95
(58) Field of Search ............................ 386/94, 95, 46; 380/102, 103; 725/25, 27, 31; H04N 7/16

(56) References Cited

U.S. PATENT DOCUMENTS

| | | | | |
|---|---|---|---|---|
| 4,945,563 A | * | 7/1990 | Horton et al. ................. | 725/31 |
| 5,134,496 A | * | 7/1992 | Schwab et al. ............. | 380/203 |
| 5,889,919 A | * | 3/1999 | Inoue et al. ................... | 705/58 |
| 6,069,647 A | * | 5/2000 | Sullivan et al. ............... | 725/31 |
| 6,374,036 B1 | * | 4/2002 | Ryan et al. .................... | 386/94 |

FOREIGN PATENT DOCUMENTS

JP        11-296976        10/1999

* cited by examiner

Primary Examiner—Vincent Boccio
Assistant Examiner—James A Fletcher
(74) Attorney, Agent, or Firm—Wenderoth, Lind & Ponack, L.L.P.

(57) ABSTRACT

A recording apparatus includes a disc recording unit for recording each video section composing a broadcast program onto a rewritable optical disc; an electronic watermark reading unit for reading electronic watermarks embedded into the video section; and a recording flag storing unit for storing a recording flag. If the read electronic watermarks show that recording is permitted, the recording flag is set as "0" to record the next video section. If the read electronic watermarks show that recording is prohibited, the recording flag is set as "1" not to record the next video section. If a broadcast program is newly selected under a condition where the recording of the currently received broadcast program is prohibited, the recording flag is reset to "0" and the first received video section of the newly selected broadcast program is recorded onto the rewritable optical disc.

12 Claims, 15 Drawing Sheets

FIG. 12

|  | CH1 MUSIC CHANNEL | CH2 SPORTS CHANNEL | CH3 PAY MOVIE CHANNEL | CH4 CULTURE CHANNEL |
|---|---|---|---|---|
| 19:00 | HIT POPS | PROFESSIONAL BASEBALL | NEW MOVIE | CHINESE CONVERSATION |
| 20:00 | ROCK | | | JAPANESE HISTORY |
| 21:00 | JAZZ | | NEW MOVIE | ENGLISH CONVERSATION |

RECORDING APPARATUS, TRANSMITTING APPARATUS, AND COMPUTER-READABLE RECORDING MEDIUM

This application is based on application No. H11-151658 filed in Japan, the content of which is hereby incorporated by reference.

BACKGROUND OF THE INVENTION

1. Field of the Invention

The present invention relates to a recording apparatus for receiving a broadcast program and recording the broadcast program onto a recording medium, a transmitting apparatus for transmitting a broadcast program, and a computer-readable recording medium.

2. Background Art

In recent years, digitized broadcast programs are being broadcast on more and more services. Due to the high cost of producing digitized broadcast programs, producers wish to restrict the recording of the digitized broadcast programs. On the contrary, consumers want to record the digitized broadcast programs onto recording media for later use. To strike a balance between these mutually contradictory needs, men of learning and researchers have proposed a technique for embedding information concerning copyright protection (copy control information) into broadcast programs as electronic watermarks.

SUMMARY OF THE INVENTION

The object of the present invention is to provide a recording apparatus for performing, if copy control information is embedded into a broadcast program as electronic watermarks, the recording of the broadcast program according to the electronic watermarks.

The following description concerns an example broadcasting system including the recording apparatus of the present invention. The construction of the present broadcasting system is shown in FIG. 1. This system includes a transmitting apparatus 500 and a recording apparatus 600. The transmitting apparatus 500 includes a watermark embedding unit 501 and a transmitting unit 502. The watermark embedding unit 501 embeds a set of electronic watermarks into each video section composing a broadcast program. The electronic watermark set shows whether the recording of the broadcast program is permitted or prohibited and each video section of the broadcast program corresponds to, for instance, a reproduction time period of ten seconds. The transmitting unit 502 transmits the broadcast program where the watermark embedding unit 501 has embedded the electronic watermark set into each video section.

The recording apparatus 600 includes a receiving unit 601, a recording unit 602, a watermark reading unit 603, and a control unit 604.

The receiving unit 601 receives a broadcast program and the recording unit 602 records the received broadcast program onto a recording medium. The watermark reading unit 603 reads electronic watermarks from the received broadcast program and the control unit 604 instructs the recording unit 602 to record or not to record the received broadcast program according to the read electronic watermarks.

The operation of the recording apparatus 600 is described in detail below. After the receiving unit 601 starts to receive a broadcast program, the watermark reading unit 603 reads the electronic watermark set embedded into the first received video section, out of video sections composing the broadcast program. If the electronic watermark set shows that the recording of the broadcast program is permitted, the control unit 604 instructs the recording unit 602 to record video sections following the first received video section. On the other hand, if the electronic watermark set shows that the recording is prohibited, the control unit 604 instructs the recording unit 602 not to record the following video sections.

By operating in this manner, the recording apparatus 600 controls the recording of broadcast programs onto recording media as intended by producers of the broadcast programs.

The following description concerns the case where the recording apparatus is currently receiving a broadcast program B whose recording is prohibited and so does not perform the recording operation, and a broadcast program A into which electronic watermarks showing that recording is permitted are embedded is newly selected. Even if the embedded electronic watermarks show that recording is permitted, the recording apparatus 600 cannot start to record the broadcast program A until the recording apparatus 600 reads an electronic watermark set from the first received video section of the broadcast program A and finds that the recording of the broadcast program A is permitted by referring to the embedded electronic watermarks and must not perform the recording operation until it becomes clear that the embedded electronic watermarks show that recording is permitted. Because the recording apparatus 600 cannot immediately start to record the broadcast program A due to the reason given above, the first video section of the broadcast program A is not recorded onto a recording medium, that is, the program A recorded onto the recording medium lacks the first video section.

While an operator will take it for granted that the broadcast program A is entirely recorded onto the recording medium because the recording is permitted, the recorded broadcast program will lack the first video section. This may have the operator inappropriately suspect that the recording apparatus is out of order.

This problem will also arise in the case where the broadcast program B, whose recording is prohibited, is aired immediately before the broadcast program A, whose recording is permitted, the recording apparatus 600 is programmed to record the broadcast program A, and the internal clock of the recording apparatus 600 is wrong. In such a case, the recording apparatus starts the recording operation earlier than the broadcast start time of the broadcast program A. Therefore, the watermark reading unit 603 reads electronic watermarks from the broadcast program B and the control unit 604 instructs the recording unit 602 not to record the following video sections according to the read electronic watermarks. As a result, the first video section of the broadcast program A cannot be recorded, like the case above.

This problem will also arise if the recording apparatus 600 switches from the non-recordable broadcast program B to the recordable broadcast program A while viewing and recording broadcast programs.

To achieve the stated object of the present invention, the recording apparatus is required to record an entire broadcast program, including copy control information showing permission to record, onto a recording medium even when an immediately preceding broadcast program includes copy control information showing that recording is prohibited.

The stated requirement is satisfied by a recording apparatus for selecting one of a plurality of broadcast programs and recording the selected broadcast program onto a recording medium, each broadcast program being composed of a plurality of video sections into each of which is embedded an electronic watermark showing whether recording of the broadcast program is permitted or prohibited, the recording apparatus including: a receiving unit for receiving video sections composing the selected broadcast program one at a time; a recording unit for performing a recording operation according to instructions; a reading unit for reading an electronic watermark from each video section received by the receiving unit; and an instructing unit for issuing (a) a first instruction to have the recording unit record a video section next to the video section from which the electronic watermark has been read if the read electronic watermark shows that recording of the selected broadcast program is permitted and (b) a second instruction to have the recording unit not record the next video section if the read electronic watermark shows that the recording is prohibited, where the instructing unit includes an instruction changing unit for canceling, when another broadcast program is selected after the second instruction has been issued, the second instruction and issuing a third instruction to have the recording unit record a video section, out of video sections of the other broadcast program, to be received first.

When a next broadcast program is selected, the recording apparatus starts to record the broadcast program onto the recording medium without waiting for an electronic watermark to be read from the firstly received video section of the broadcast program. Consequently, if the next broadcast program is selected with the currently received broadcast program including an electronic watermark showing that recording is prohibited (which means that the recording unit has been instructed not to record the following video sections), the recording apparatus will start to record the next broadcast program as soon as the next broadcast program is selected. As a result, the next broadcast program is recorded onto the recording medium from the first video section to be received.

Here, the recording apparatus may further include a selection receiving unit for receiving a selection of the other broadcast program from an operator, where the instruction changing unit issues the third instruction when the selection receiving unit receives the selection.

Here, the recording apparatus may further include: a time information generating unit for, when the selection receiving unit receives the selection after the second instruction has been issued, generating first time information that shows when the selection receiving unit receives the selection; and a time information storing unit for storing the time information.

Here, when the selection receiving unit receives a further selection of a broadcast program different than the other broadcast program, the time information generating unit may generate second time information showing when the selection receiving unit receives the further selection, and the recording apparatus may further include: a difference calculating unit for calculating a difference between the first time information and the second time information; and a judging unit for judging whether the difference exceeds the predetermined time period, the instruction changing unit issues a fourth instruction to have the recording unit record a video section, out of video sections of the different broadcast program, to be firstly received.

Here, the recording apparatus may further include: a broadcast start time prestoring unit for prestoring a broadcast start time of a specific broadcast program; a time measuring unit for measuring a current time; and a selection unit for selecting the specific broadcast program, when the current time measured by the time measuring unit matches the broadcast start time prestored in the broadcast start time prestoring unit, where when the selection unit selects the specific broadcast program, the instruction changing unit issues a fifth instruction to have the recording unit record a video section, out of video sections of the specific broadcast program, to be firstly received. With this construction, the recording apparatus calculates the interval between the selection of a broadcast program whose recording is permitted and the selection of another broadcast program whose recording is prohibited and judges whether the interval exceeds a predetermined time period. If the interval is shorter than the predetermined time period, the recording apparatus does not reset the recording unit.

In this manner, the recording apparatus protects the copyrights on broadcast programs from a malicious third party who tries to record a broadcast program whose recording is prohibited onto a recording medium by frequently switching between the broadcast program and another broadcast program whose recording is permitted.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 12 shows an example of EPG;

DESCRIPTION OF THE PREFERRED EMBODIMENTS

<First Embodiment>

A recording apparatus of the first embodiment is described below with reference to the drawings. The data construction of a broadcast program to be recorded onto a recording medium by the recording apparatus of the present embodiment is described before the recording apparatus.

Figure 1:
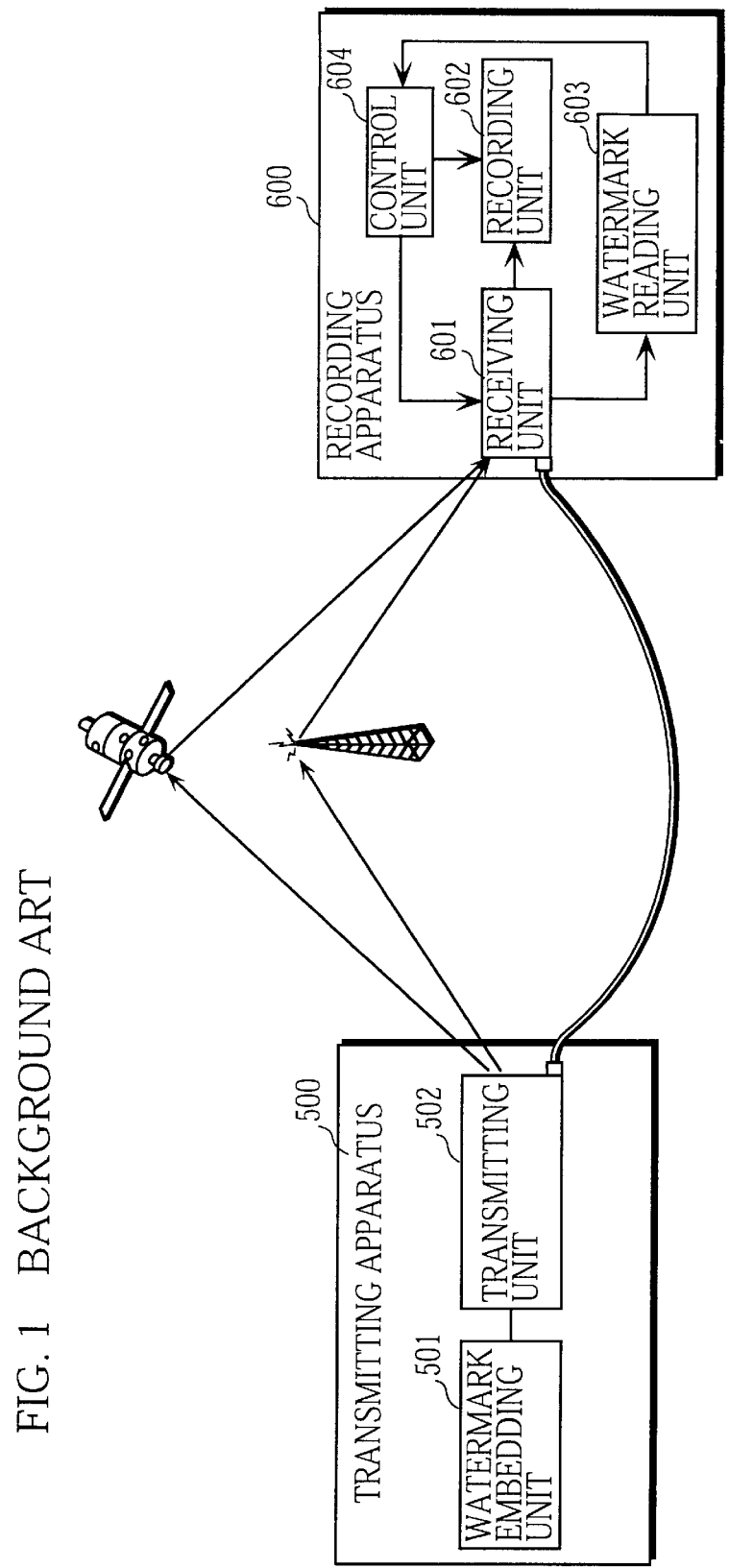
FIG. 1 shows the construction of an example broadcasting system including the recording apparatus of the present invention.
Figure 2:
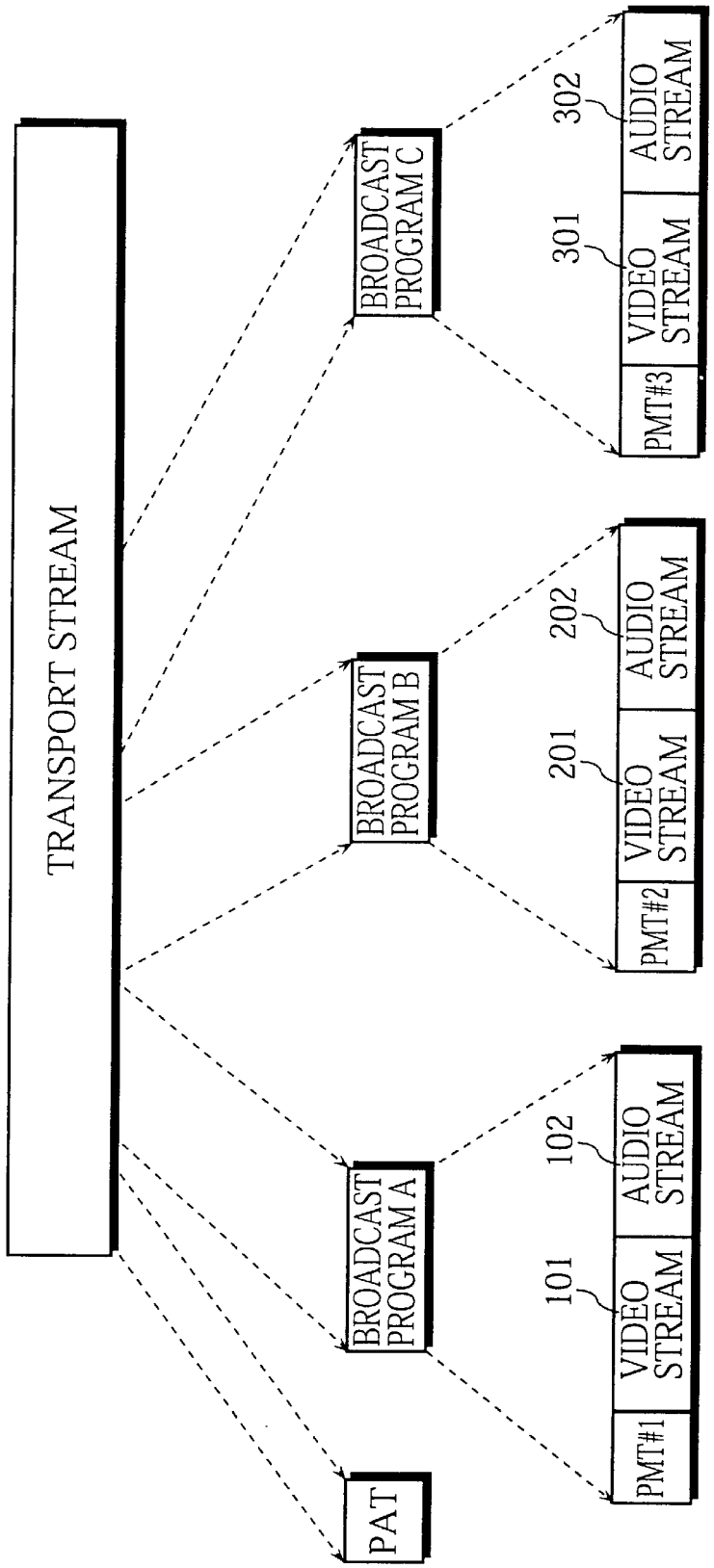
FIG. 2 shows the data construction of a transport stream used to transmit broadcast programs.

FIG. 2 shows the data construction of a transport stream used to transmit broadcast programs. In this drawing, a plurality of broadcast programs A, B, and C are multiplexed into the transport stream along with a PAT (Program Association Table) showing the allocation of program numbers and PMTIDs to the plurality of broadcast programs. Each broadcast program is composed of a video stream, an audio stream, and a PMT (Program MAP Table) showing the allocation of PIDs to the video and audio streams. Here, each PID (Packet Identification) is 13-bit information used to identify a stream and is an identifier showing the attribute of the stream. In the example shown in FIG. 2, the broadcast program A includes PMT#1, a video stream 101, and an audio stream 102. Similarly, the broadcast program B includes PMT#2, a video stream 201, and an audio stream 202, and the broadcast program C includes PMT#3, a video stream 301, and an audio stream 302. The recording apparatus of the present embodiment records video and audio streams, out of various data included in the transport stream, as broadcast programs onto rewritable optical discs, such as DVD-RAMs, DVD-RWs, CD-RWs, and CD-Rs.

Figure 3:
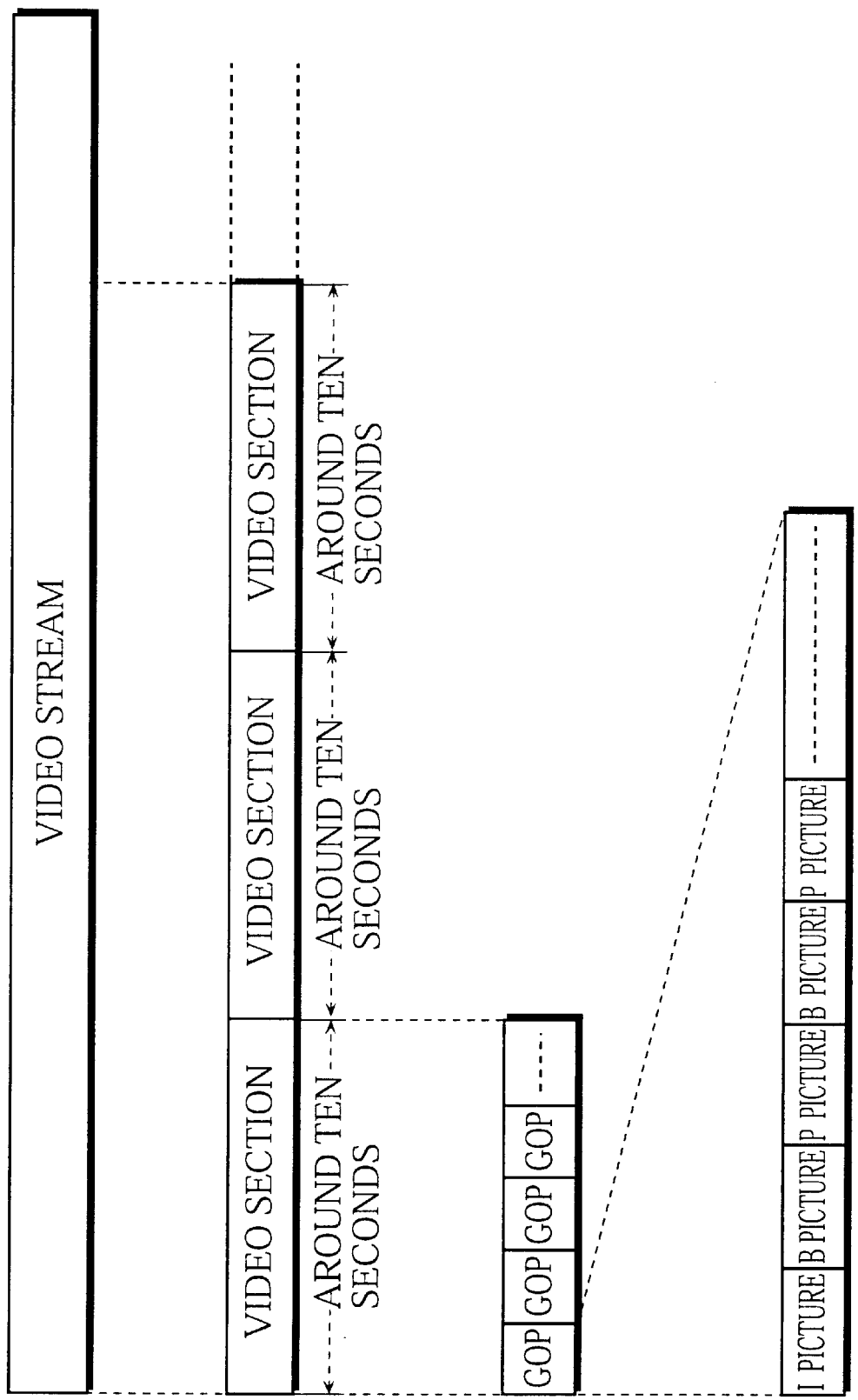
FIG. 3 shows the construction of a video stream.

FIG. 3 shows the construction of a video stream. As shown in this drawing, the video stream includes a plurality of video sections that are each ten seconds long. Copy control information is embedded into each video section. The copy control information is divided into a set of electronic watermarks, is embedded into each video section of a broadcast program, and shows whether the recording of the broadcast program is permitted or prohibited. A plurality of video sections which each include the copy control information described above are recorded as follows. While a broadcast program is continuously being received, the recording apparatus reads an electronic watermark set from the first received video section of the broadcast program. If the electronic watermark set representing the copy control information shows that recording is permitted, the recording apparatus records the following video sections onto a rewritable optical disc. Because an electronic watermark set is embedded into each of the plurality of video sections composing a video stream as described above, the recording of a broadcast program is controlled according to the copy control information, even if the recording information is started halfway through the broadcast program.

Here, in this specification, it is assumed that if no electronic watermark set is embedded into each video section of a broadcast program, the recording of the broadcast program is permitted as a rule. That is, in the case where no electronic watermark set is detected in picture data in the first video section of a broadcast program even if the recording apparatus attempts to read an electronic watermark set after the reception of video sections has been started, the recording apparatus determines that the recording of the broadcast program is permitted and records the broadcast program onto a recording medium.

It should be noted here that a more detailed explanation of electronic watermarks, such as the method of embedding electronic watermarks and the advantages of electronic watermarks, is given in "*Foundations of Electronic Watermark*, Kineo Matsui, Morikita Shuppan Co., Ltd.", "*Electronic Watermark Protects Multimedia Era*, a cover story of Nikkei Electronics, Feb. 24, 1997", and "*Electronic Watermark (Cryptosystem in Multimedia Era)*, Akira Inoue, Maruyama Gakugei Syuppan*".

Also, while each video section is around ten seconds long in this specification for ease of explanation, the video section may be shorter or longer than this. However, the video section length needs to be determined by taking the following points into account. If each video section into which an electronic watermark set is embedded is longer, the number of divided pieces (electronic watermarks) of the copy control information increases. This reduces the amount of data that has to be embedded into one picture and so reduces the effect on the picture quality of the picture. Consequently, the embedding of watermarks has less effect on the picture quality of broadcast programs as a whole. Also, if the copy control information is divided into a larger number of pieces, reconstructing the copy control information will require much time and effort. This makes is difficult for a malicious third party to tamper with the copy control information and so protects the copyrights on broadcast programs with higher security. On the other hand, if each video section is made longer, more time will be required to read the copy control information. This means that it is uncertain whether the recording of a broadcast program is permitted of prohibited for a long time. Accordingly, the video section length should be determined appropriately by considering these points.

Figure 4:
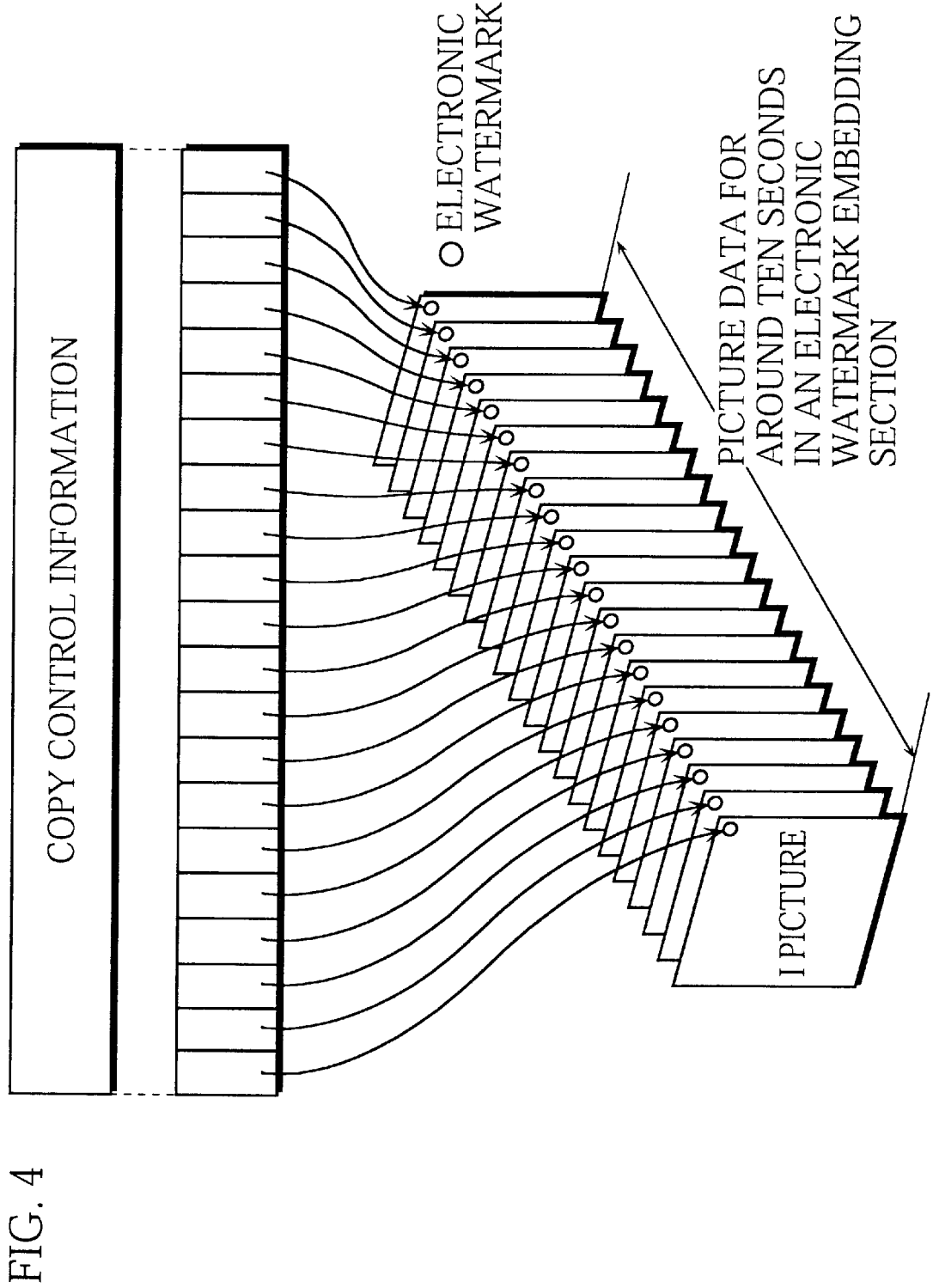
FIG. 4 shows the state where copy control information is divided into divided pieces and the divided pieces are separately embedded into a plurality of pieces of picture data composing a video section.

The construction of each video section is described below. Each video section is a collection of GOPs (Groups of Pictures) corresponding to a reproduction period of around ten seconds. Each GOP includes a plurality of pieces of picture data that have been compressed according to the interrelations between frames. Each piece of picture data can be classified into an I (Intra) picture, a B (Bidirectionally Predictive) picture, or a P (Predictive) picture. As shown in FIG. 4, each divided piece of copy control information is embedded into one piece of picture data as an electronic watermark. Also, each piece of picture data is given a DTS (Decode Time Stamp) showing the time to decode the piece of picture data and a PTS (Presentation Time Stamp) showing the time to reproduce the piece of picture data.

A set of the PAT and a plurality of PMTs is called PSI (Program Specific Information) and is used to find PIDs given to video and audio streams composing a broadcast program according to the program number given to the broadcast program.

Figure 5:
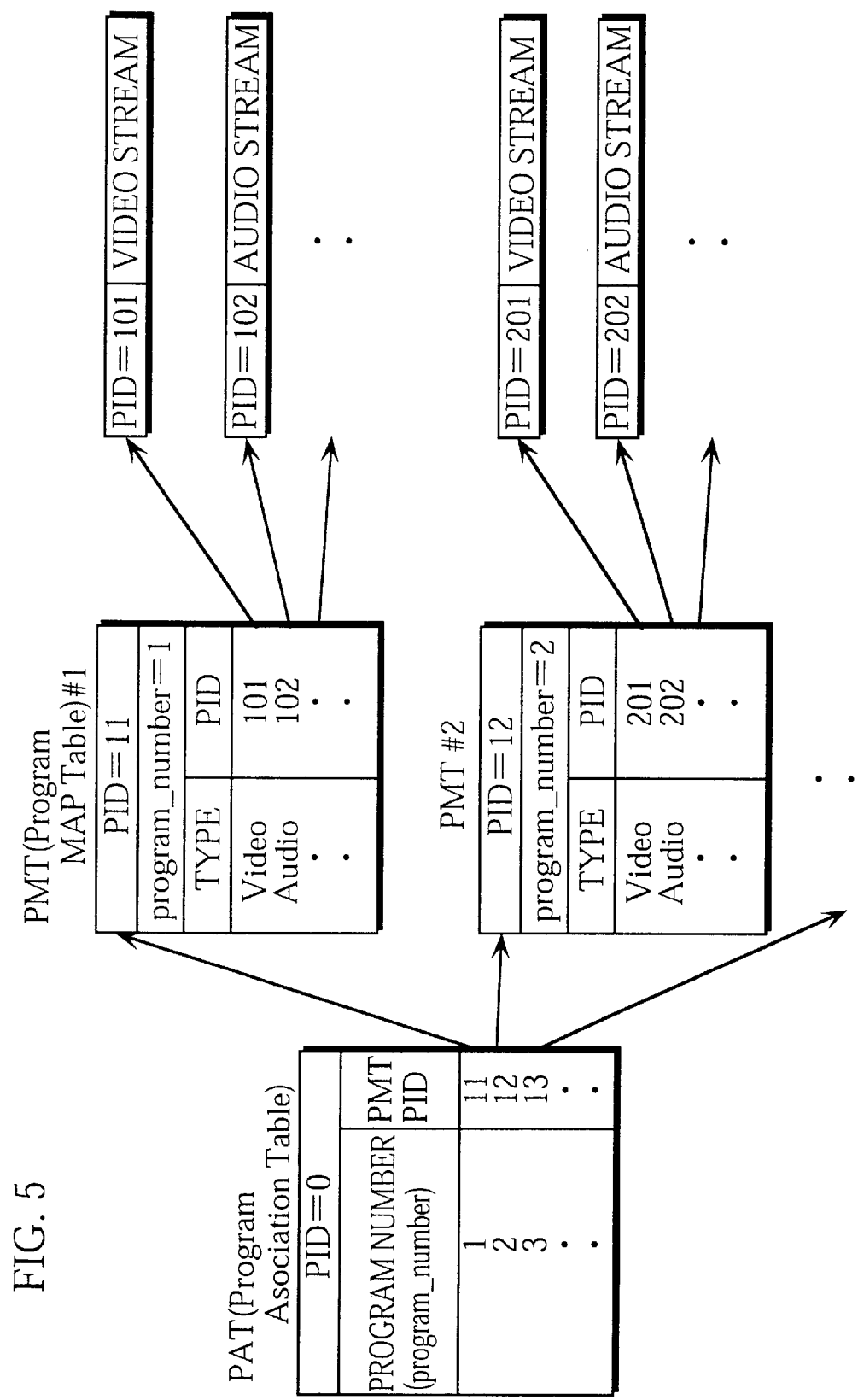
FIG. 5 shows the hierarchical construction of PSI.

FIG. 5 shows the hierarchical construction of the PSI. In this drawing, the PAT is given a PID "0" and includes a plurality of program numbers "1", "2", and "3" and PMTIDs "11", "12", and "13", with each program number being associated with one PMTID. PMT#1 is a PMT corresponding to the broadcast program A given Program_Number "1" and indicates PIDs "101" and "102" which are respectively given to the video stream 101 and the audio stream 102 composing the broadcast program A.

Also, PMT#2 is a PMT corresponding to the broadcast program B given Program_Number "2" and indicates PIDs "201" and "202" which are respectively given to the video stream 201 and the audio stream 202 composing the broadcast program B.

The video and audio streams composing a broadcast program are obtained by referring to the PAT and PMTs described above according to the program number given to the broadcast program.

Figure 6:
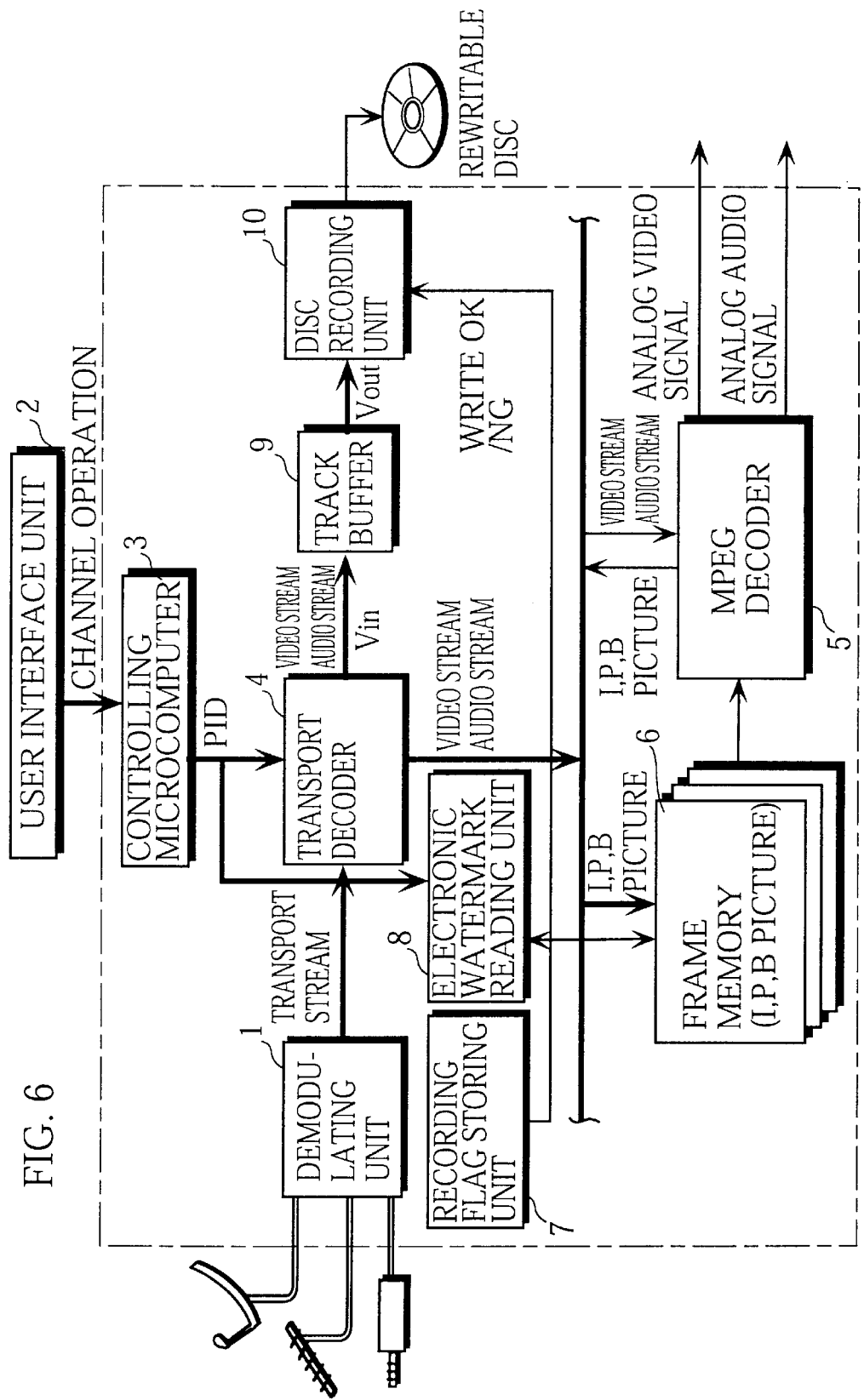
FIG. 6 shows the construction of the recording apparatus of the first embodiment.

The data construction of a broadcast program has been described above. The following description concerns the internal construction of the recording apparatus of the present embodiment. FIG. 6 shows the construction of the present recording apparatus. As shown in this drawing, the recording apparatus includes a demodulating unit 1, a user interface unit 2, a controlling microcomputer 3, a transport decoder 4, an MPEG decoder 5, a frame memory 6, a permission/prohibition flag storing unit 7, an electronic watermark reading unit 8, a track buffer 9, and a disc recording unit 10.

The demodulating unit 1 demodulates broadcast waves of a satellite broadcast, ground wave broadcast, or cable television broadcast to obtain transport streams and outputs the transport streams to the transport decoder 4.

The user interface unit 2 receives user's instructions inputted using a remote controller and the front panel of the recording apparatus.

The controlling microcomputer 3 determines which broadcast program should be received according to the channel number that the user interface unit 2 received from a user or the channel selection made by the user using an EPG (Electronic Program Guide). After determining which broadcast program should be received, the controlling microcomputer 3 finds the video and audio streams composing the broadcast program by referring to the PSI using the program number given to the broadcast program. The controlling microcomputer 3 then outputs PIDs given to the video and audio streams to the transport decoder 4. The processing from the user's operation to the PID output is performed according to the procedure below.

First, the controlling microcomputer 3 obtains the program number (program_number) corresponding to the broadcast program that should be received by referring to various information, such as the EPG, and finds the PAT given the PID "0", among various data included in the inputted transport stream. After the PAT is found, the controlling microcomputer 3 obtains the PID of the PMT corresponding to the obtained program number by referring to the PAT. The controlling microcomputer 3 then finds the PMT given the obtained PID in the transport stream and obtains PIDs of the video and audio streams of the broadcast program that should be received by referring to the PMT. Finally, the transport decoder 4 obtains the video and audio streams given the stream PIDs from the transport stream and outputs the video and audio streams.

The MPEG decoder 5 includes a clock unit for measuring the current time and decodes each piece of picture data included in a video stream by comparing the current time measured by the clock unit with the DTS given to the piece of picture data. The MPEG decoder 5 also stores the decoded pieces of picture data into the frame memory 6 and sequentially displays each piece of picture data stored in the frame memory 6 by comparing the current time measured by the clock unit with the PTS given to the piece of picture data.

The permission/prohibition flag storing unit 7 (hereinafter simply referred to as the "recording flag storing unit") stores a permission/prohibition flag (hereinafter simply referred to as the "recording flag"). If set as "0" for a broadcast program, the recording flag shows that the recording of the broadcast program is permitted. If set as "1" for a broadcast program, the recording flag shows that the recording of the broadcast program is prohibited.

Figure 7:
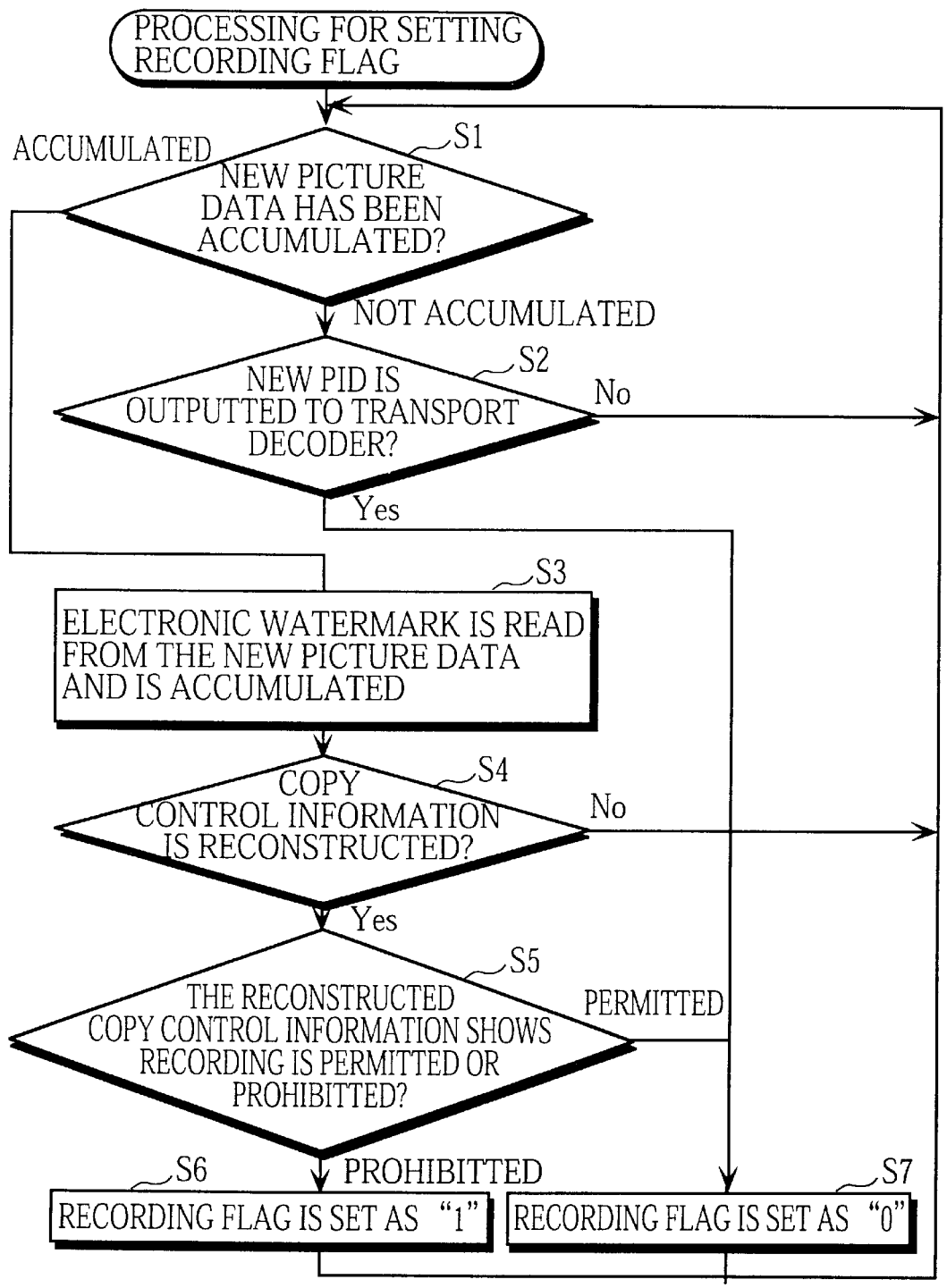
FIG. 7 is a flowchart showing the processing procedure of an electronic watermark reading unit.

The electronic watermark reading unit 8 reads divided pieces of the copy control information (electronic watermarks), which have been separately embedded into a plurality of pieces of picture data composing the first video section, by sequentially referring to each piece of picture data written into the frame memory 6 for reproduction. By reading the divided pieces of the copy control information, the electronic watermark reading unit 8 reconstructs the copy control information. If the copy control information reconstructed in this manner shows that recording is permitted, the electronic watermark reading unit 8 sets the recording flag in the recording flag storing unit 7 as "0" to allow the disc recording unit 10 to record the following video sections. If the reconstructed copy control information shows that recording is prohibited, the electronic watermark reading unit 8 sets the recording flag as "1" to prohibit the disc recording unit 10 from recording the following video sections. Aside from the setting of the recording flag according to the copy control information, the electronic watermark reading unit 8 detects whether the controlling microcomputer 3 has output a new PID to the transport decoder 4 and resets the recording flag to "0" at that point. FIG. 7 is a flowchart showing a series of operations performed by the electronic watermark reading unit 8. The processing procedure of the electronic watermark reading unit 8 is described below with reference to this flowchart.

After the electronic watermark reading unit 8 is activated, the processing enters into the loop process composed of steps S1 and S2. In step S1, the electronic watermark reading unit 8 judges whether a piece of picture data has been accumulated in the frame memory 6. In step S2, the electronic watermark reading unit 8 judges whether a new PID has been outputted to the transport decoder 4. If the judgement result in step S1 is affirmative, the electronic watermark reading unit 8 reads the electronic watermark embedded into the piece of picture data and accumulates the electronic watermark as part of the copy control information in step S3. The electronic watermark reading unit 8 then judges whether all divided pieces of the copy control information have been accumulated, that is, whether the copy control information has been reconstructed in step S4. If the judgement result in step S4 is negative, the processing returns to step S1. If the judgement result in step S4 is affirmative, the electronic watermark reading unit 8 judges whether the copy control information shows permission or prohibition to record in step S5. If the recording is prohibited, the electronic watermark reading unit 8 sets the recording flag in the recording flag storing unit 7 as "1" in step S6 and the processing returns to the loop process composed of steps S1 and S2. If recording is permitted, the electronic watermark reading unit 8 sets the recording flag as "0" in step S7 and the processing returns to the loop process. The above processing in steps S3–S7 is repeated while the input of video sections of the same broadcast program continues. If the operator instructs the recording apparatus to receive another broadcast program, the controlling microcomputer 3 outputs a new PID to the transport decoder 4. After the new PID is outputted, the judgement result in step S2 becomes Yes and the processing proceeds to step S7. As a result, the recording flag in the recording flag storing unit 7 is set as "0".

The track buffer 9 sequentially stores each piece of picture data outputted from the transport decoder 4 and outputs the stored pieces of picture data to the disc recording unit 10 in FIFO (first-in first-out) form.

The disc recording unit 10 records, when the recording flag in the recording flag storing unit 7 is set as "0", video sections received afterward by sequentially writing each piece of picture data outputted from the track buffer 9 onto a rewritable optical disc. When the recording flag in the recording flag storing unit 7 is set as "1", the disc recording unit 10 does not record the following video sections.

Figure 8:
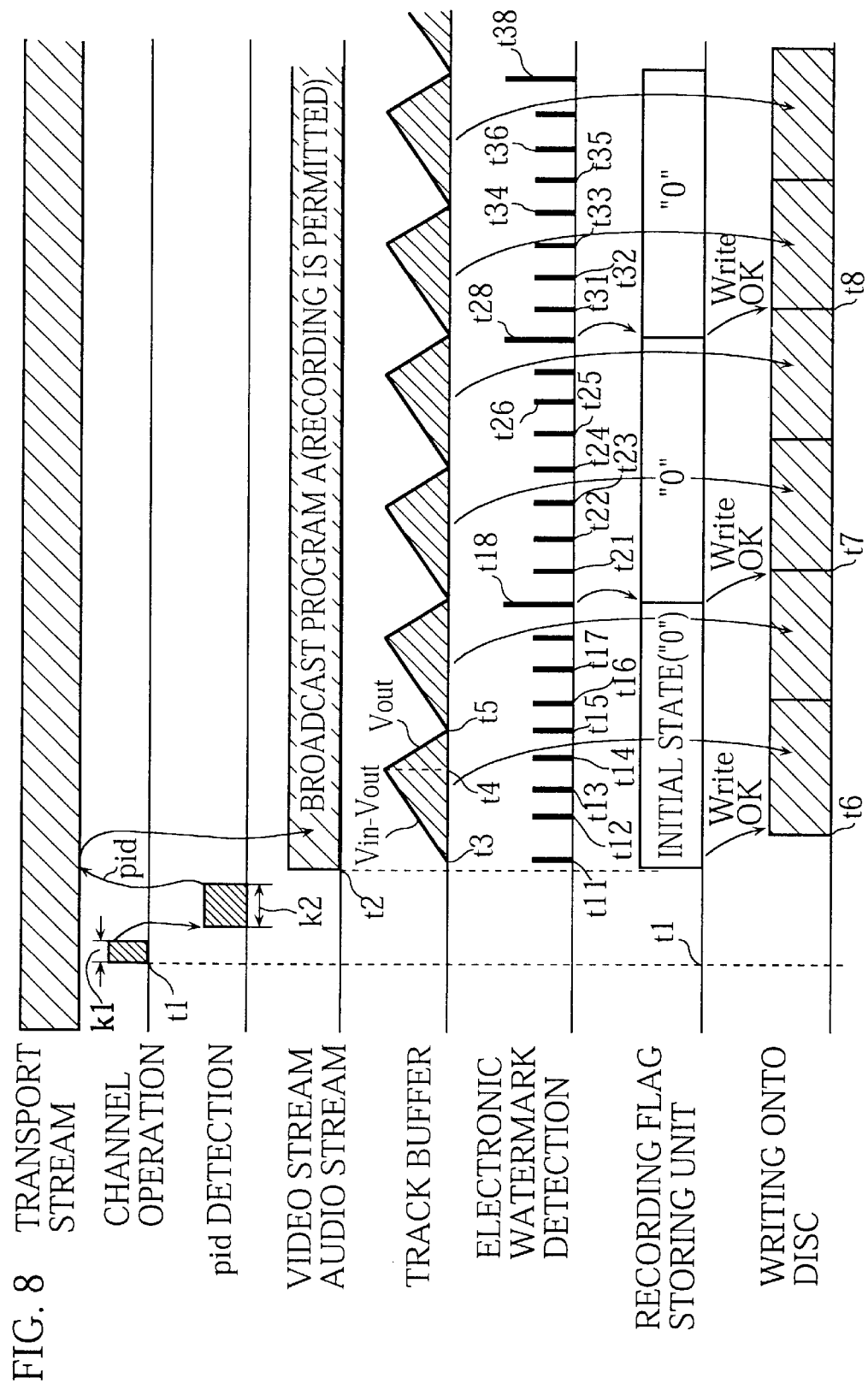
FIG. 8 is a timing chart showing data transfers between construction elements of the recording apparatus in the first case.

The operation of each construction element described above is explained below using three cases. In the first case, the recording apparatus receives the broadcast program A into which copy control information showing that recording is permitted is embedded and records the broadcast program A onto a rewritable optical disc. FIG. 8 is a timing chart showing data transfers between the construction elements in this case.

The first level in this drawing shows a period during which the demodulating unit 1 demodulates a broadcast wave and outputs a transport stream to the transport decoder 4 after the recording apparatus has been turned on.

The second level shows that a user selects a broadcast program at the timing t1 and the corresponding program number is obtained a period k1 after the timing t1.

The third level shows that it takes the period k2 to find PSI using the obtained program number and PIDs specifying the audio and video streams of the selected broadcast program are then outputted to the transport decoder 4.

The fourth level shows that the output of the video and audio streams given the PIDs found by referring to the PSI is commenced at the timing t2. As can be seen from this level, the video and audio streams are continuously outputted from the timing t2 through the hatched period.

The fifth level shows the timing when picture data is inputted into the track buffer 9 and the variation with time in the amount of data accumulated in the track buffer 9. On this level, the straight line between the timings t3 and t4 shows that the amount of data accumulated in the track buffer 9 increases at a constant rate, while the straight line between the timings t4 and t5 shows that the amount of the accumulated data decreases at a constant rate. Assuming that the transfer rate from the transport decoder 4 to the track buffer 9 is the rate Vin and the transfer rate from the track buffer 9 to the disc recording unit 10 is the rate Vout, the gradient of the straight line between timings t3 and t4 shows the rate Vin-Vout and the gradient between timings t4 and t5 shows the rate Vout. As shown on the fifth level, after the timing t5, the data amount in the track buffer 9 varies according to a pattern that repeats the changes between the timings t3 and t5. That is, this level shows that data input and output are repeated as between the timings t3 and t5 so long as the track buffer 9 receives picture data from the transport decoder 4.

The sixth level shows that each piece of picture data composing the video stream is referred to and the electronic watermark embedded into the piece of picture data is read during the period between the timings t11 and t17. During this period t11–t17, electronic watermarks read at the timings t11–t17 are combined to reconstruct the copy control information and it is judged whether the recording is permitted or prohibited. As can be seen from this level, the electronic watermark reading unit 8 also refers to the picture data and judges whether recording is permitted or prohibited during the following period between t21 and t28 and the period between t31 and t37.

The seventh level shows the setting of the recording flag in the recording flag storing unit 7. The reading of a complete set of electronic watermarks takes until the timing t18. Up to this point, only part of the copy control information has been read, so that the recording flag is temporarily set as "0". At the timing t18, it is judged whether the recording is permitted or prohibited and the recording flag is finally set as "0".

The eighth level is a timing chart showing how the disc recording unit 10 writes picture data onto the rewritable optical disc. As shown on this level, the disc recording unit 10 starts to write the video and audio streams onto the rewritable optical disc without waiting for the electronic watermark reading unit 8 to read an entire set of electronic watermarks and judge whether the recording is permitted or prohibited. This is because the recording flag is initially set as "0" and the track buffer 9 starts to output the video and audio streams at the timing t3. In the case shown in FIG. 8, the selected broadcast program includes copy control information showing that recording is permitted and it is judged that the recording of this broadcast program is permitted at the timing t18. Therefore, the disc recording unit 10 continues the recording of the video and audio streams onto the rewritable optical disc after the timing t7.

Figure 9:
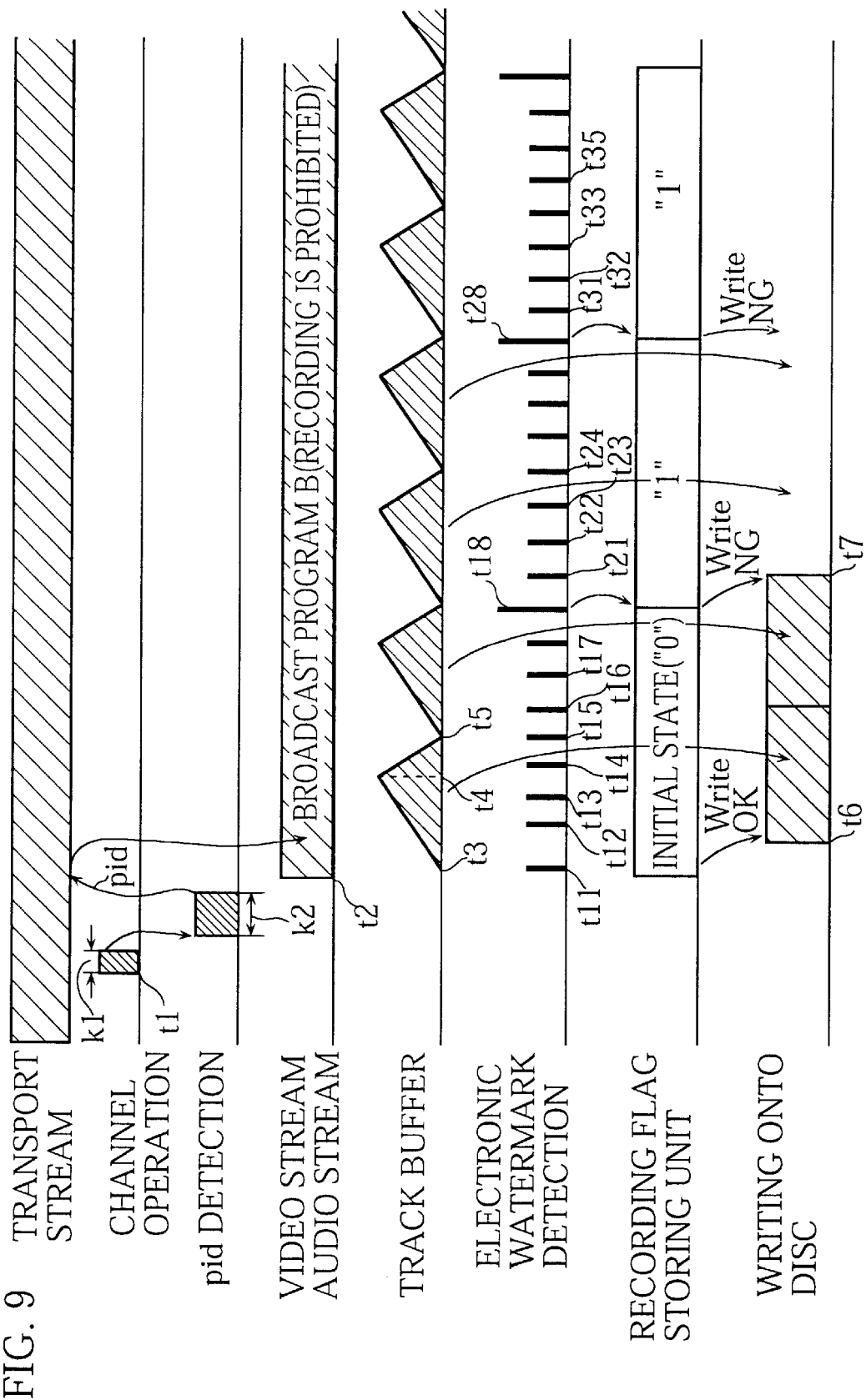
FIG. 9 is a timing chart showing data transfers between the construction elements in the second case.

The following description concerns the second case where an operator selects the broadcast program B, into which copy control information showing that recording is prohibited is embedded, and tries to record the broadcast program B onto a rewritable optical disc. FIG. 9 is a timing chart showing the data transfers between the construction elements of the recording apparatus in the second case. The first to fifth levels in this drawing are the same as those in FIG. 8. The seventh level shows that the recording flag is set as "0" between the timings t11 and t18, so that the first parts of the video and audio streams of the broadcast program B are recorded onto the rewritable optical disc, as in FIG. 8. The difference between FIGS. 8 and 9 is the operation from the timing t18 on the sixth level. Because the broadcast program B selected by the operator includes copy control information showing that the recording of this broadcast program is prohibited, it is judged that the recording is prohibited at the timing t18. As a result, on the seventh level, the recording flag is set as "1" at the timing t18 to show that recording is prohibited. Consequently, the video and audio streams are not recorded onto the rewritable optical disc from the timing t7. Although the recording permission/prohibition judgement is also performed at the timing t28, the judgement result at this timing does not change, which is to say it is judged that the recording is prohibited again, and so the broadcast program B is not recorded.

Figure 10:
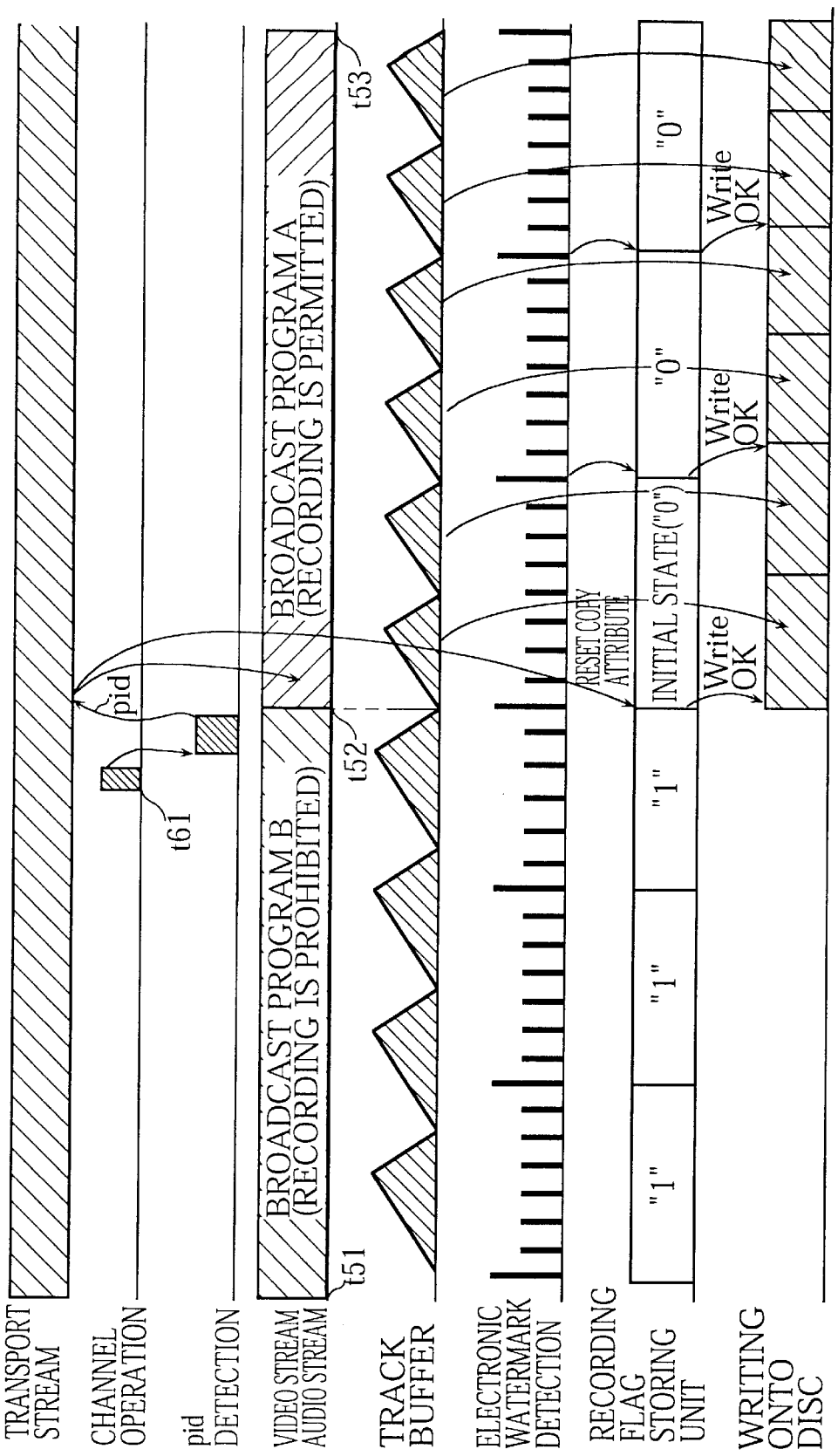
FIG. 10 is a timing chart showing data transfers between the construction elements in the third case.

The following description concerns the third case where the recording apparatus sequentially receives the broadcast program B, which includes copy control information showing that recording is prohibited, and the broadcast program A, which includes copy control information showing that recording is permitted, and records the broadcast program A onto a rewritable optical disc. FIG. 10 is a timing chart showing the data transfers between the construction elements of the recording apparatus in this case. As can be seen from the fourth level in this drawing, the broadcast program B, whose recording is prohibited, is received between the timings t51 and t52 and the broadcast program A, whose recording is permitted, is received between the timings t52 and t53. After the copy control information embedded into the broadcast program B is read and it is determined that the recording of this program is prohibited, the recording flag is set as "1" between the timings t51 and t52 to show that recording is prohibited.

The operator then selects the broadcast program A via the user interface unit 2 at the timing t61 between the timings t51 and t52. Receiving this channel selection, the controlling microcomputer 3 obtains the corresponding program number, finds the corresponding PIDs by referring to the PSI according to the program number, and outputs the PIDs to the transport decoder 4. The transport decoder 4 outputs the broadcast program A given the PIDs to the track buffer 9 between the timings t52 and t53. When the PIDs are outputted, the electronic watermark reading unit 8 resets the recording flag in the recording flag storing unit 7 as "0".

At the timing t52 when the controlling microcomputer 3 outputs the PIDs to the transport decoder 4 and the broadcast program received by the recording apparatus is switched from the broadcast program B to the broadcast program A, the recording flag in the recording flag storing unit 7 is reset to "0" showing that recording is permitted. Therefore, the disc recording unit 10 starts to record the video and audio streams of the broadcast program A at the timing t52.

In this manner, the disc recording unit 10 starts to record the video and audio streams of the broadcast program A onto the rewritable optical disc without waiting for a recording permission/prohibition judgement to be made.

As described above, in the first embodiment, the electronic watermark reading unit 8 resets the recording flag in the recording flag storing unit 7 to "0" at the timing when PIDs corresponding to a user's operation are obtained by referring to the PSI and are outputted to the transport decoder 4. Therefore, the recording apparatus of the present embodiment sequentially records the video and audio streams of the broadcast program A onto the rewritable disc without waiting for the electronic watermarks embedded into the broadcast program A and confirm that the recording of this broadcast program is permitted. As a result, the broadcast program A is entirely recorded onto the rewritable optical disc from the first video section.

(a) In the first embodiment, the switching of broadcast programs is detected using the timing at which a new PID is outputted from the controlling microcomputer 3 to the transport decoder 4. However, the switching of broadcast programs may be detected by monitoring the DTS given to each piece of picture data included in a video stream and detecting the timing when decoding start times specified by the DTSs become discontinuous. In this case, the MPEG decoder 5 checks whether the DTSs given to two successive pieces of picture data are continuous. Here, "continuous" means that the difference between the DTSs is 1/33 second that equates to the display period of each picture in television broadcasting. If the DTSs are continuous, it can be assumed that the same broadcast program is being received. On the other hand, if the DTSs are not continuous, it can be assumed that the recording apparatus has switched between broadcast programs. Therefore, when the DTSs becomes discontinuous, the MPEG decoder 5 resets the recording flag in the recording flag storing unit 7 to "0".

Figure 11:
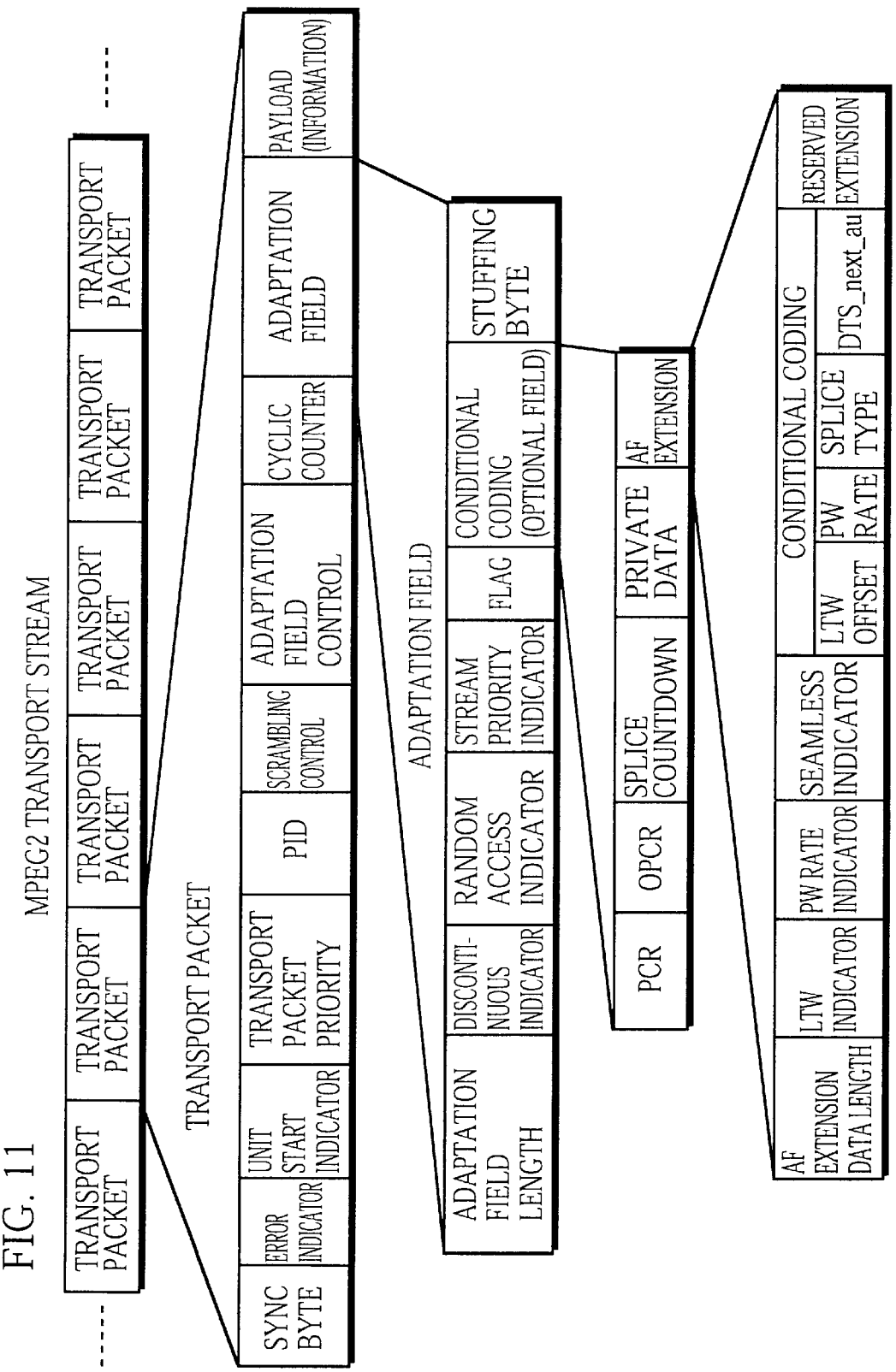
FIG. 11 shows the construction of a transport stream.

(b) Also, the timing when the recording apparatus has switched between broadcast programs may be detected by monitoring the continuity of PCRs (Program Clock References) included in a transport stream. The PCRs are described below. FIG. 11 shows the construction of a transport stream. As shown in this drawing, the transport stream is composed of a plurality of transport packets. Each transport packet includes various information, such as a sync byte and a unit start indicator, and a PCR exists in the conditional coding field within the adaptation field of each transport packet. It should be noted here that the PMTs and video and audio streams composing the plurality of broadcast programs shown in FIG. 2 are divided into a plurality of pieces and stored in the payloads of the plurality of transport packets. The PCR given to each transport packet is used to set an initial time in the clock unit of the MPEG decoder 5 and to adjust the current time measured by the clock unit. The MPEG decoder 5 refers to PCRs included in the plurality of transport packets and judges whether PCRs in two successive transport packets are continuous. If the PCRs in two successive transport packets are not continuous, the MPEG decoder 5 determines that the recording apparatus switched between broadcast programs and the transport decoder 4 resets the recording flag in the recording flag storing unit 7 as "0".

(c) The timing when the recording apparatus has switched between broadcast programs may be detected using the broadcast start time and broadcast end time of each broadcast program shown in an EPG, which usually shows the content of each broadcast program along with the broadcast start time and the broadcast end time of the broadcast program. An example of the EPG is shown in FIG. 12. As can be seen from this drawing, the EPG shows various program titles, such as "New Movie" on the pay movie channel, "Hit Pops", "Rock", and "Jazz" on the music channel, and "Chinese Conversation" and "Japanese History" on the culture channel, with each program title being associated with a broadcast start time and broadcast end time. The recording apparatus can find that new movies are broadcasted from "19:00" to "21:00" by referring to the EPG. If the copy control information showing that recording is prohibited is embedded into the new movies, the recording apparatus can determine the timing for resetting the recording flag by referring to the EPG.

(d) In the first embodiment, a set of electronic watermarks is embedded into each video section including a plurality of pieces of picture data. However, a set of electronic watermarks may be embedded into each audio section including a plurality of pieces of audio data.

(e) Although recorded onto a rewritable optical disc in the first embodiment, each broadcast program may be recorded onto a fixed disk or a semiconductor memory card.

<Second Embodiment>

In the first embodiment, if the broadcast program B and the broadcast program A are sequentially selected, the first video section of the broadcast program A is unconditionally recorded onto a rewritable optical disc. In the second embodiment, however, if the broadcast program B and the broadcast program A are sequentially selected, a limitation is imposed on the recording of the broadcast program A.

A recording apparatus of the second embodiment is described below. If an operator instructs the recording apparatus to start the recording of the broadcast program B whose recording is prohibited and then selects the broadcast program A whose recording is permitted, the recording apparatus detects the timing when the broadcast program A is selected and holds time information showing the detected timing. If the operator then selects the broadcast program B again, the recording apparatus detects the timing when the broadcast program B is selected again and reads the stored time information. The recording apparatus then calculates the difference between these timings and judges whether the calculated difference exceeds a predetermined time period. If the judgement result is affirmative, the recording onto a recording medium is performed; if the judgement result is negative, the recording is not performed.

In this manner, the present recording apparatus protects the copyrights on broadcast programs from a third party who tries to record the broadcast program B whose recording is prohibited onto a rewritable optical disc by frequently switching between the broadcast program B and the broadcast program A.

<Third Embodiment>

In the first and second embodiments, the recording apparatus sets and resets the recording flag by itself. In the third embodiment, however, a transmitting apparatus transmits information specifying a resetting of the recording flag as prohibition reset information. The recording apparatus of the third embodiment resets the recording flag to "0" according to the prohibition reset information.

Figure 13A:
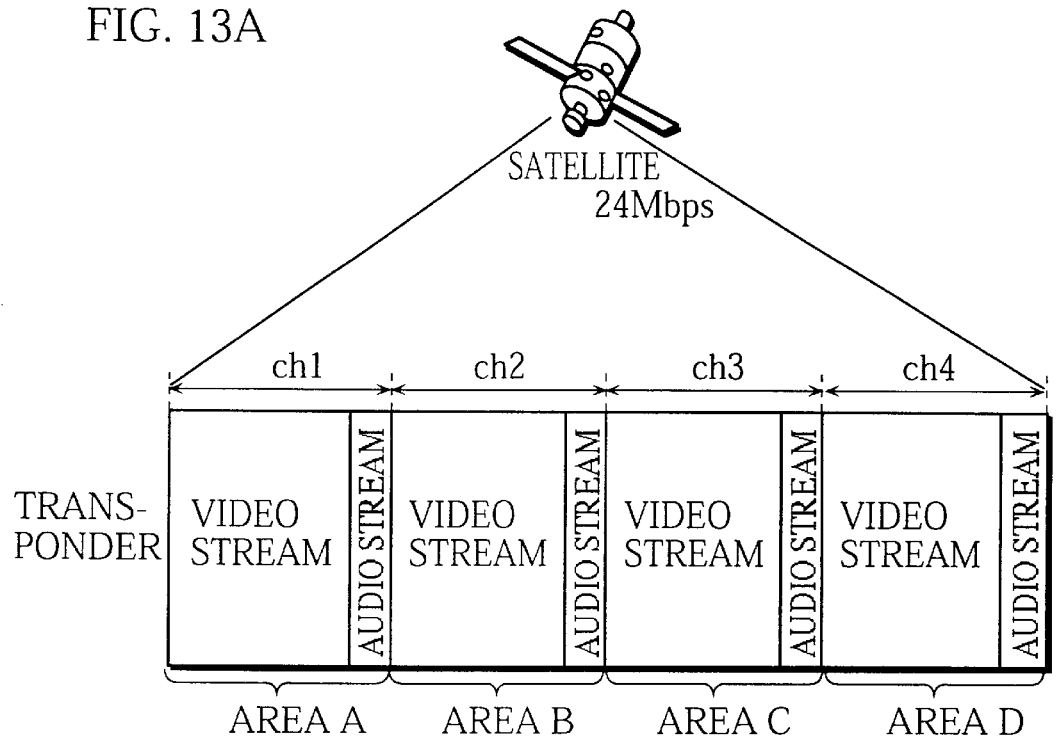
FIGS. 13A and 13B show how prohibition reset information is transmitted.
Figure 13B:
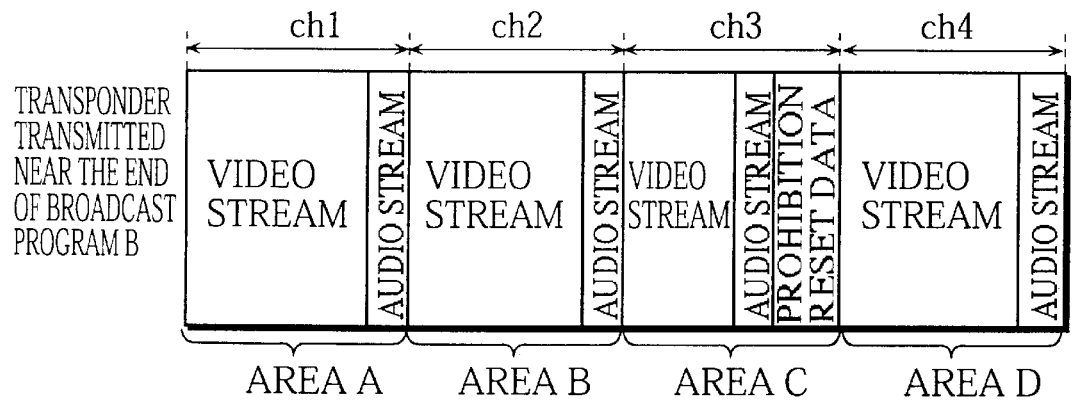

FIGS. 13A and 13B show how the prohibition reset information is transmitted. The transponder in these drawings are transmitted from the transmitting apparatus to each home via a broadcasting satellite. The transponder in this embodiment includes areas A–D which are each assigned to one of channels ch1–ch4. Here, it is assumed that the transmission rate of the transponder is 24 Mbps and this transmission rate is equally divided among the four areas.

Because 6 Mbps (=24 Mbps/4) is assigned to the area C, a maximum of 6 Mbps can be assigned to the video stream, audio stream, and data composing the broadcast program aired on the channel ch3.

If the broadcast program B that includes copy control information showing that recording is prohibited is aired on the channel ch3, a portion of the 6 Mbps transmission rate is assigned to each of the video and audio streams of the broadcast program B. When the end of the broadcast program B is approaching, a part, for example 2 Mbps, of the 6 Mbps transmission rate is assigned for the transmission of the prohibition reset information that designates a resetting of the recording flag in the recording apparatus. FIG. 13B shows the assignment of channel ch3 of the transponder when the end of the broadcast program B is approaching.

Although the area C is assigned only to the video and audio streams in FIG. 13A, the assignments of the area C to the video and audio streams are reduced and part of the area C is assigned for the transmission of the prohibition reset information.

Figure 14:
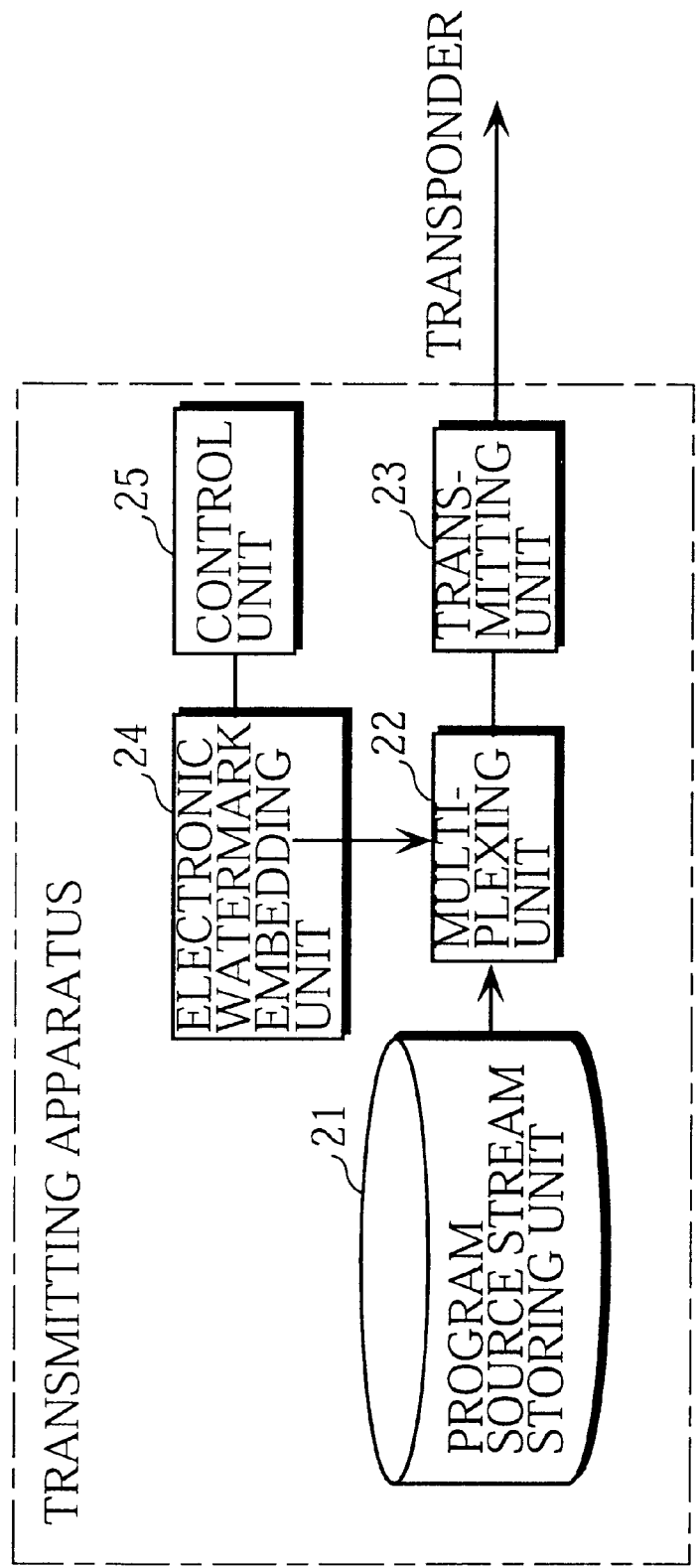
FIG. 14 shows the construction of the transmitting apparatus of the third embodiment.

FIG. 14 shows the transmitting apparatus of the present embodiment that is constructed to transmit the prohibition reset information described above. The present transmitting apparatus is described below with reference to FIG. 14. As shown in this drawing, the transmitting apparatus includes a program source stream storing unit 21, a multiplexing unit 22, a transmitting unit 23, an electronic watermark embedding unit 24, and a control unit 25.

The program source stream storing unit 21 stores the video and audio streams composing each broadcast program.

The multiplexing unit 22 fetches a video section of the video stream from the program source stream storing unit 21 and multiplexes the video section with audio data composing the audio stream.

The transmitting unit 23 assigns each of the plurality of areas in the transponder to one of the pieces of multiplexed data obtained from the multiplexing unit 22 and transmits the transponder into which each broadcast program has been multiplexed.

The electronic watermark embedding unit 24 repeatedly embeds copy control information showing that recording is prohibited into each video section of the broadcast program B fetched by the multiplexing unit 22.

The control unit 25 controls the transmitting unit 23 to multiplex the prohibition reset information designating a resetting of the recording flag to "0" into the transponder with the video and audio streams of the broadcast program B when the current time reaches a point in time that precedes the broadcast end time of the broadcast program B by a predetermined time period. As a result, the transmitting unit 23 transmits the transponder into which the prohibition reset information has been multiplexed. The length of the predetermined time period described above equates to that of each video section described in the first embodiment.

The recording apparatus of the third embodiment resets the recording flag according to the prohibition reset information transmitted as part of a broadcast program. This reduces the processing load on the recording apparatus.

In this embodiment, the prohibition reset information is transmitted near the end of the broadcast program B to have the recording apparatus reset the recording flag. However, the prohibition reset information may indicate the broadcast end time of the broadcast program B, and such prohibition reset information may be transmitted as part of the broadcast program B. In such a case, the recording apparatus resets the recording flag by referring to the broadcast end time described in the prohibition reset information. As a result, it becomes unnecessary to transmit the prohibition reset information near the end of the broadcast program B.

<Fourth Embodiment>

In the third embodiment, the transmitting apparatus transmits the prohibition reset information to have the recording apparatus reset the recording flag. The transmitting apparatus in the fourth embodiment, however, embeds a set of electronic watermarks showing that recording is permitted into a video section, out of the video sections composing the broadcast program B, to be transmitted near the end of this program.

Figure 15:
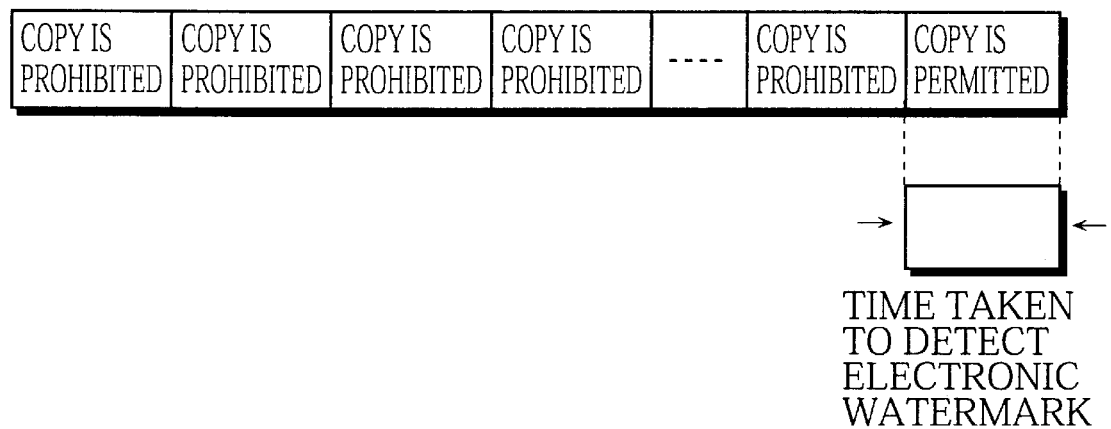
FIG. 15 shows an example of the broadcast program transmitted by the transmitting apparatus of the fourth embodiment.

In this embodiment, the transmitting apparatus does not include the control unit 25 used in the third embodiment for having the multiplexing unit 22 multiplex the prohibition reset information, and the electronic watermark embedding unit 24 operates in a different way to that in the third embodiment. That is, the electronic watermark embedding unit 24 repeatedly embeds copy control information showing that recording is prohibited into each video section of the broadcast program B fetched by the multiplexing unit 22. When the current time is approaching the broadcast end time of the broadcast program B, the electronic watermark embedding unit 24 embeds copy control information showing that recording is permitted into the video section currently fetched by the multiplexing unit 22. In this manner, the copy control information for the broadcast program B is changed to show that recording is permitted near the end of the broadcast program B. FIG. 15 shows an example of the broadcast program B transmitted by the transmitting apparatus of the fourth embodiment. As can be seen from this drawing, while a plurality of video sections show that the recording is prohibited, the last video section is set to show that the recording is permitted.

As described above, the recording apparatus of the fourth embodiment updates the recording flag according to the copy control information that has been transmitted as part of a broadcast program and shows that recording is permitted. This reduces the processing load on the recording apparatus, like the third embodiment.

It should be noted here that the processing procedure of the electronic watermark reading unit 8 described with reference to the flowchart shown in FIG. 7 and the other processing procedures of the recording apparatus and transmitting apparatus of the present invention may be achieved by an executable program. Also, such an executable program may be recorded onto a computer-readable recording medium and the recorded executable program may be distributed or sold.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus for selecting one of a plurality of broadcast programs and recording the selected broadcast program onto a recording medium, each broadcast program being composed of a plurality of video sections into each of which is embedded an electronic watermark showing whether recording of the broadcast program is permitted or prohibited, the recording apparatus comprising:

a receiving means for receiving video sections composing the selected broadcast program one at a time;

a recording means for performing a recording operation according to instructions;

a reading means for reading an electronic watermark from each video section received by the receiving means;

an instructing means for issuing (a) a first instruction to have the recording means record a video section next to the video section from which the electronic watermark has been read if the read electronic watermark shows that recording of the selected broadcast program is permitted and (b) a second instruction to have the recording means not record the next video section if the read electronic watermark shows that the recording is prohibited, wherein the instructing means includes an instruction changing unit for canceling, when an other broadcast program is selected after the second instruction has been issued, the second instruction and issuing a third instruction to have the recording means record a video section, out of video sections of the other broadcast program, that is first received;

a selection receiving means for receiving a selection of the other broadcast program from an operator, wherein the instruction changing unit issues the third instruction when the selection receiving means receives the selection;

a time information generating means for, when the selection receiving means receives the selection after the second instruction has been issued, generating first time information that shows when the selection receiving means receives the selection;

a time information storing means for storing the time information, wherein when the selection receiving means receives a further selection of a broadcast program different to the other broadcast program, the time information generating means generates second time information showing when the selection receiving means receives the further selection;

a difference calculating means for calculating a difference between the first time information and the second time information; and a judging means for judging whether the difference exceeds a predetermined time period, wherein if the difference exceeds the predetermined time period, the instruction changing unit issues a fourth instruction to have the recording means record a video section, out of video sections of the different broadcast program, that is first received.

2. A recording apparatus for selecting one of a plurality of broadcast programs and recording the selected broadcast program onto a recording medium, each broadcast program being composed of a plurality of video sections into each of which is embedded an electronic watermark showing whether recording of the broadcast program is permitted or prohibited, the recording apparatus comprising:

a receiving means for receiving video sections composing the selected broadcast program one at a time;

a recording means for performing a recording operation according to instructions;

a reading means for reading an electronic watermark from each video section received by the receiving means;

an instructing means for issuing (a) a first instruction to have the recording means record a video section next to the video section from which the electronic watermark has been read if the read electronic watermark shows that recording of the selected broadcast program is permitted and (b) a second instruction to have the recording means not record the next video section if the read electronic watermark shows that the recording is prohibited, wherein the instructing means includes an instruction changing unit for canceling, when an other broadcast program is selected after the second instruction has been issued, the second instruction and issuing a third instruction to have the recording means record a video section, out of video sections of the other broadcast program, that is first received;

a broadcast start time prestoring means for prestoring a broadcast start time of a specific broadcast program;

a time measuring means for measuring a current time; and a selection means for selecting the specific broadcast program, when the current time measured by the time measuring means matches the broadcast start time prestored in the broadcast start time prestoring means, wherein when the selection means selects the specific broadcast program, the instruction changing unit issues a fifth instruction to have the recording means record a video section, out of video sections of the specific broadcast program, that is first received.

3. A recording apparatus for receiving a broadcast program and recording the broadcast program onto a recording medium, the broadcast program being composed of a plurality of pieces of picture data, an electronic watermark being embedded into each of at least two pieces of picture data at a start of the broadcast program, and the electronic watermarks being divided parts produced by dividing copy control information showing whether recording of the broadcast program is permitted or prohibited, the recording apparatus comprising:

a receiving means for receiving pieces of picture data of the broadcast program one at a time;

a reading means for reading an electronic watermark from each piece of picture data received by the receiving means and accumulating the read electronic watermark as a divided part;

a reconstructing means for reconstructing the copy control information by combining divided parts that have already been read from pieces of picture data with a divided part that is read from a next piece of picture data; and a recording means for recording, onto the recording medium, (a) each piece of picture data received by the receiving means until the copy control information is reconstructed and (b) each piece of picture data following the at least two pieces of picture data if the reconstructed copy control information shows that the recording of the broadcast program is permitted.

4. A transmitting apparatus that transmits a broadcast program for a predetermined time period, comprising:
- a storing means for storing video sections composing the broadcast program;
- a reading means for reading a video section from the storing means;
- an embedding means for embedding, into the read video section, an electronic watermark showing that recording of the broadcast program is prohibited;
- a transmitting means for transmitting the video section into which the electronic watermark has been embedded;
- a repeating means for having the reading means, embedding means, and transmitting means repeatedly operate through the predetermined time period; and
- a multiplexing means for multiplexing reset information, which specifies a resetting of a prohibition against recording of the broadcast program, into a last video section of the broadcast program read by the reading means and having the transmitting means transmit the last video section.

5. A transmitting apparatus that transmits a broadcast program for a predetermined time period, comprising:
- a storing means for storing video sections composing the broadcast program;
- a reading means for reading a video section from the storing means;
- an embedding means for embedding, into the read video section, an electronic watermark showing that recording of the broadcast program is prohibited;
- a transmitting means for transmitting the video section into which the electronic watermark has been embedded;
- a repeating means for having the reading means, embedding means, and transmitting means repeatedly operate through the predetermined time period; and
- a multiplexing means for multiplexing reset information, which specifies a resetting of a prohibition against recording of the broadcast program and a time to reset the prohibition, into a video section read by the reading means and having the transmitting means transmit the video section into which the reset information has been multiplexed.

6. A transmitting apparatus that transmits a broadcast program for a predetermined time period, comprising
- a storing means for storing video sections composing the broadcast program;
- a reading means for reading a video section from the storing means;
- an embedding means for embedding, into the read video section, an electronic watermark showing that recording of the broadcast program is prohibited;
- a transmitting means for transmitting the video section into which the electronic watermark has been embedded;
- a repeating means for having the reading means, embedding means, and transmitting means repeatedly operate through the predetermined time period; and
- a controlling means for controlling the embedding means to embed a set of electronic watermarks, which shows that the recording of the broadcast program is permitted, into a last video section of the broadcast program read by the reading means.

7. A computer-readable recording medium which records a program that has a computer execute a procedure for selecting one of a plurality of broadcast programs and recording the selected broadcast program onto a recording medium, each broadcast program being composed of a plurality of video sections into each of which is embedded an electronic watermark showing whether recording of the broadcast program is permitted or prohibited, the program comprising:
- a receiving step for receiving video sections composing the selected broadcast program one at a time;
- a recording step for performing a recording operation according to instructions;
- a reading step for reading an electronic watermark from each video section received in the receiving step;
- an instructing step for issuing (a) a first instruction to have the recording step record a video section next to the video section from which the electronic watermark shows that recording of the selected broadcast program is permitted and (b) a second instruction to have the recording step not record the next video section if the read electronic watermark shows that the recording is prohibited,
- wherein the instructing step includes an instruction changing substep for canceling, when an other broadcast program is selected after the second instruction has been issued, the second instruction and issuing a third instruction to have the recording step record a video section, out of video sections of the other broadcast program, that is first received;
- a selection receiving step for receiving a selection of the other broadcast program from an operator, wherein the instruction changing substep issues the third instruction when the selection is received in the selection receiving step;
- a time information generating step for, when the selection is received in the selection receiving step after the second instruction has been issued, generating first time information that shows when the selection is received in the selection receiving step,
- wherein the computer includes a time information recording medium for recording the time information,
- wherein when a further selection of a broadcast program different to the other broadcast program is received in the selection receiving step, second time information showing when the further selection is received in the selection receiving step is generated in the time information generating step;
- a difference calculating step for calculating a difference between the first time information and the second time information; and
- a judging step for judging whether the difference exceeds a predetermined time period,
- wherein if the difference exceeds the predetermined time period, a fourth instruction to have the recording step record a video section, out of video sections of the different broadcast program, that is first received is issued in the instruction changing substep.

8. A computer-readable recording medium which records a program that has a computer execute a procedure for selecting one of a plurality of broadcast programs and recording the selected broadcast program onto a recording medium, each broadcast program being composed of a plurality of video sections into each of which is embedded an electronic watermark showing whether recording of the broadcast program is permitted or prohibited, the program comprising:

a receiving step for receiving video sections composing the selected broadcast program one at a time;

a recording step for performing a recording operation according to instructions;

a reading step for reading an electronic watermark from each video section received in the receiving step;

an instructing step for issuing (a) a first instruction to have the recording step record a video section next to the video section from which the electronic watermark shows that recording of the selected broadcast program is permitted and (b) a second instruction to have the recording step not record the next video section if the read electronic watermark shows that the recording is prohibited, wherein the instructing step includes an instruction changing substep for canceling, when an other broadcast program is selected after the second instruction has been issued, the second instruction and issuing a third instruction to have the recording step record a video section, out of video sections of the other broadcast program, that is first received, wherein the computer further includes a broadcast start time recording medium for recording a broadcast start time of a specific broadcast program, and the program further comprises:

a time measuring step for measuring a current time; and a selection step for selecting the specific broadcast program when the current time measured in the time measuring step matches the broadcast start time recorded on the broadcast start time recording medium, wherein when the specific broadcast program is selected in the selection step, a fifth instruction to have the recording step record a video section, out of video sections of the specific broadcast program, that is first received is issued in the instruction changing substep.

9. A computer-readable recording medium which records a program that has a computer execute a procedure for receiving a broadcast program and recording the broadcast program onto a recording medium, the broadcast program being composed of a plurality of pieces of picture data, an electronic watermark being embedded into each of at least two pieces of picture data at a start of the broadcast program, and the electronic watermarks being divided parts produced by dividing copy control information showing whether recording of the broadcast program is permitted or prohibited, the program comprising:

a receiving step for receiving pieces of picture data of the broadcast program one at a time;

a reading step for reading an electronic watermark from each piece of picture data received in the receiving step and accumulating the read electronic watermark as a divided part;

a reconstructing step for reconstructing the copy control information by combining divided parts that have already been read from pieces of picture data with a divided part that is read from a next piece of picture data; and a recording step for recording, onto the recording medium, (a) each piece of picture data received in the receiving step until the copy control information is reconstructed and (b) each piece of picture data following the at least two pieces of picture data if the reconstructed copy control information shows that the recording of the broadcast program is permitted.

10. A computer-readable recording medium that records a program for transmitting a broadcast program for a predetermined time period, the program comprising:

a reading step for reading a video section from a recording medium that records video sections composing the broadcast program;

an embedding step for embedding, into the read video section, an electronic watermark showing that recording of the broadcast program is prohibited;

a transmitting step for transmitting the video section into which the electronic watermark has been embedded;

a repeating step for repeating the reading step, embedding step, and transmitting step through the predetermined time period; and a multiplexing step for multiplexing reset information, which specifies a resetting of a prohibition against recording of the broadcast program, into a last video section of the broadcast program read in the reading step and having the transmitting step transmit the last video section.

11. A computer-readable recording medium that records a program for transmitting a broadcast program for a predetermined time period, the program comprising:

a reading step for reading a video section from a recording medium that records video sections composing the broadcast program;

an embedding step for embedding, into the read video section, an electronic watermark showing that recording of the broadcast program is prohibited;

a transmitting step for transmitting the video section into which the electronic watermark has been embedded;

a repeating step for repeating the reading step, embedding step, and transmitting step through the predetermined time period; and a multiplexing step for multiplexing reset information, which specifies a resetting of a prohibition against recording of the broadcast program and a time to reset the prohibition, into a video section read in the reading step and having the transmitting step transmit the video section into which the reset information has been multiplexed.

12. A computer-readable recording medium that records a program for transmitting a broadcast program for a predetermined time period, the program comprising:

a reading step for reading a video section from a recording medium that records video sections composing the broadcast program;

an embedding step for embedding, into the read video section, an electronic watermark showing that recording of the broadcast program is prohibited;

a transmitting step for transmitting the video section into which the electronic watermark has been embedded;

a repeating step for repeating the reading step, embedding step, and transmitting step through the predetermined time period; and a controlling step for controlling the embedding step to embed a set of electronic watermarks, which shows that the recording of the broadcast program is permitted, into a last video section of the broadcast program read in the reading step.

* * * * *